United States Patent [19]
Lakin et al.

[11] 4,043,103
[45] Aug. 23, 1977

[54] LAWN EDGER ACCESSORY

[76] Inventors: George W. Lakin, 14312 Harrington St. Robert L. Lakin, 10952 Barbett, both of Garden Grove, Calif. 92463

[21] Appl. No.: 661,837

[22] Filed: Mar. 15, 1976

[51] Int. Cl.² ............................................. A01D 55/18
[52] U.S. Cl. .......................................... 56/295; 30/276; 56/12.7; 56/256
[58] Field of Search ........................ 56/12.7, 17.5, 295, 56/256; 30/276, 264, 347

[56] References Cited

U.S. PATENT DOCUMENTS 3,826,068  7/1974  Ballas et al. ............................ 56/12.7

FOREIGN PATENT DOCUMENTS 1,281,450  12/1961  France ................................... 56/12.7
6,938,265  10/1969  Germany ............................... 56/12.7

*Primary Examiner*—Jay N. Eskovitz
*Attorney, Agent, or Firm*—William C. Babcock

[57] ABSTRACT

An improved cutter assembly adapted for use with a rotary edger comprising a circular spool for storing peripherally thereon a plurality of plastic filaments, such spool being receivable within a circular retainer which in turn is provided with a plurality of radially extending peripheral openings formed to direct the corresponding filaments to the exterior of the retainer. The spool and the retainer are secured for rotation on the mounting arbor of the rotary device, the retainer furthermore including an exteriorly directed peripheral groove around the circumference thereof arranged to include the filament openings. The spool itself includes a plurality of filament securing openings to facilitate assembly. In an alternative embodiment, the exterior face of the spool is cut out with a plurality of radial notches through which the filaments are passed to permit insertion of the spool into the retainer. The retainer is similarly provided with equally displaced longitudinal notches through which the filaments are deployed into the radial openings.

8 Claims, 10 Drawing Figures

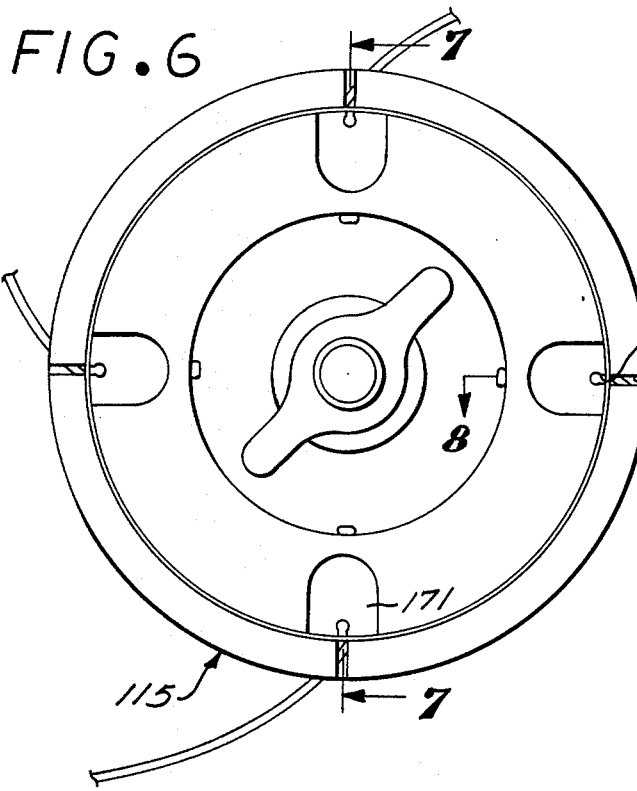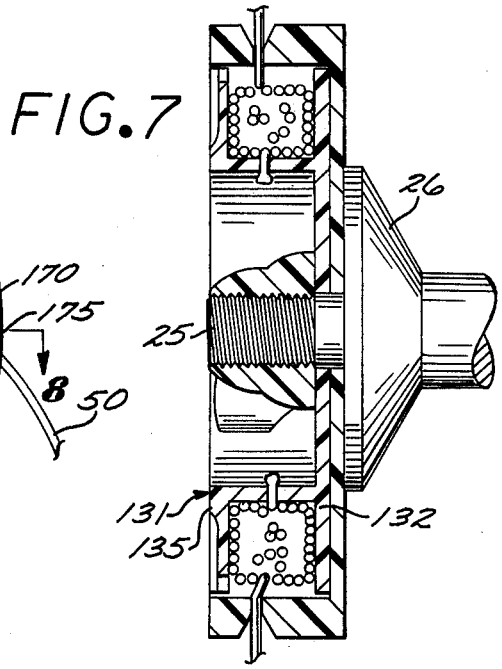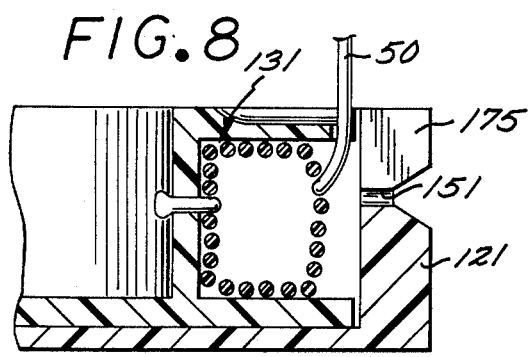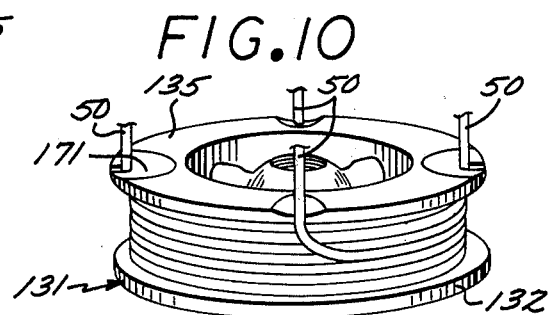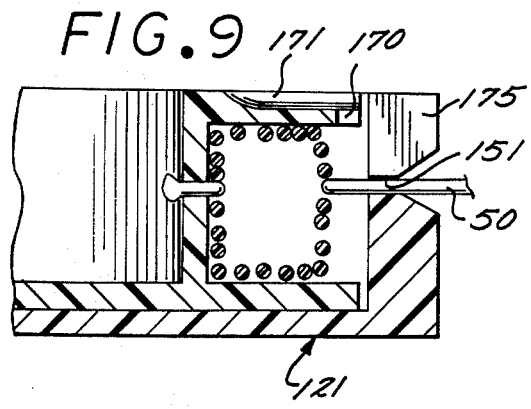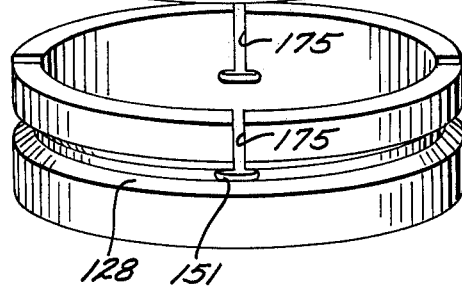

LAWN EDGER ACCESSORY

BACKGROUND OF THE INVENTION

1. Field of the Invention

The present invention relates to rotary cutting devices and more particularly to cutting devices which by virtue of centrifugal forces align a plurality of filaments in a cutting plane.

2. Description of the Prior Art

The use of rotary cutters in devices like lawn mowers or edgers have been practiced extensively in the past. It is commonly recognized that rigid cutters like blades present a serious hazard to the user of the device and for that reason various attempts have been made in the past to change the configuration of such cutters. One of the more recent developments in the design of such cutters has been the use of filaments which are deployed in a cutting plane by the rotary motion of the cutter and which by virtue of the centrifugal forces thereon are deployed to achieve tip speeds sufficiently great to sever grass strands or similar growth. The advantage of such filament cutters is that the kinetic energy of a single strand is relatively small and therefore any hazard to the user is minimized. By virtue of such low tip kinetic energy, however, the plane of rotation of the filaments is easily disturbed with a consequent distortion of the angular momentum of the cutter assembly and high bending stresses at the point of attachment of the filaments to the cutter assembly. Thus as the rigidity of the cutting element is reduced and cutting action is effected by way of increased tip speed, the concurrent effect is to form a relatively flexible cutting plane which concentrates its flexure stresses at the point of attachment.

SUMMARY OF THE INVENTION

Accordingly it is the general purpose and object of the present invention to provide a cutting assembly for a rotary device like a lawn edger wherein a plurality of plastic filaments are deployed from the periphery of a rotary assembly which also provides the function of a storage spool for storing such filaments.

Other objects of the invention are to provide a rotating filament cutter wherein the deployment of the filaments can be achieved by the withdrawal of one filament.

Yet, further objects of the invention are to provide a rotary cutter including filaments deployed therefrom wherein the cutter assembly comprises a circular spool received within an annular retainer both secured by common engagement.

Briefly, these and other objects are accomplished within the present invention by providing a circular spool having a peripheral groove formed around the exterior thereof for storing in spiral wind-up a plurality of plastic filaments. The spool is receivable within the interior of an annular retainer which includes yet another peripheral groove around the exterior thereof communicating with the interior by way of a plurality of radial filament receiving bores. Disposed through these openings are the respective filaments stored on the spool with the spool and the retainer being commonly secured for rotation on a rotary arbor extending from a powered device like a lawn edger. More specifically, the arbor is provided with a shouldered seat having a stud extending therefrom, the retainer and the spool both including a corresponding central bore to engage such stud. A locking nut, conformed for manual grasping, then engages the distal end of the extending stud to frictionally secure the spool relative the retainer and the retainer relative the arbor. In this manner should any of the filaments break as result of use a single articulation of the locking nut will release the spool sufficiently to permit additional withdrawal of filaments therefrom. Furthermore, the peripheral arrangement of the groove around the spool within the annular opening in the retainer provides for convenient disposition of the filaments at a point of maximum angular inertia to thus utilize the stored filaments to advantage and increasing the angular momentum. By way of this arrangement, the momentum is therefore less sensitive to the disturbing effects of filament impact.

To facilitate for an even distribution of filament weight around the periphery of the spool the engagement points of the filaments relative to the spool are similarly distributed around the interior arc thereof. More specifically, each filament comprises a plastic strand such as nylon filament strand which, on the interior end, includes an enlarged bulbous section. The spool in turn includes a circular central cavity adapted to receive the securing nut and furthermore provided with a plurality of radially directed holes conformed to the dimensions of the strand. These radially directed holes are distributed over the periphery of the central cavity to thus distribute the weight of the filaments in a uniform fashion around the spool. Thus the filaments are insertable with the small end passing through these radial holes, engaging the edges of such holes by the bulbous enlargement. The filaments are then passed through the ports or openings formed in the retainer and are wound up on the spool to expose a selected length for the cutting action described above.

In an alternative configuration, the exterior annular face of the spool is provided with a plurality of exteriorly directed radial cutouts into which the filaments are deployed during spool insertion. After the spool is received within the dished retainer, these same filaments are manually passed through a corresponding set of longitudinal slots on the periphery of the retainer into the filament opening at the bottom of the peripheral groove.

BRIEF DESCRIPTION OF THE DRAWING

FIG. 6 is a front view illustration of yet another embodiment of rotary cutter assembly constructed according to the present invention;

FIG. 7 is a side view, in section, taken along line 7—7 of FIG. 6;

FIG. 8 is a sectional detail view taken along line 8—8 of FIG. 6;

FIG. 9 is a sectional detail view illustrating a manipulative displacement of the structure shown in FIG. 8; and FIG. 10 is a perspective view, in separated parts, illustrating the assembly sequence of the cutter assembly shown in FIG. 6.

DESCRIPTION OF THE PREFERRED EMBODIMENTS

While the present invention is disclosed herein with reference to a lawn edger assembly, such is for purposes of illustration only. It is to be understood that various other applications of the inventive rotary cutter are possible and no intent to limit the scope of the invention by the choice of the illustrations herein is expressed.

Figure 1:
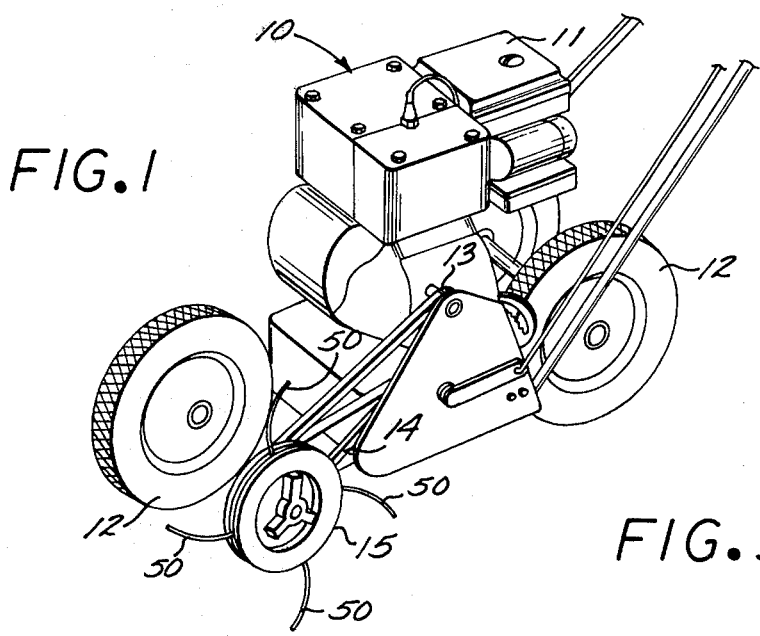
FIG. 1 is a perspective illustration of a powered lawn edger incorporating a rotary cutter constructed according to the present invention.
Figure 2:
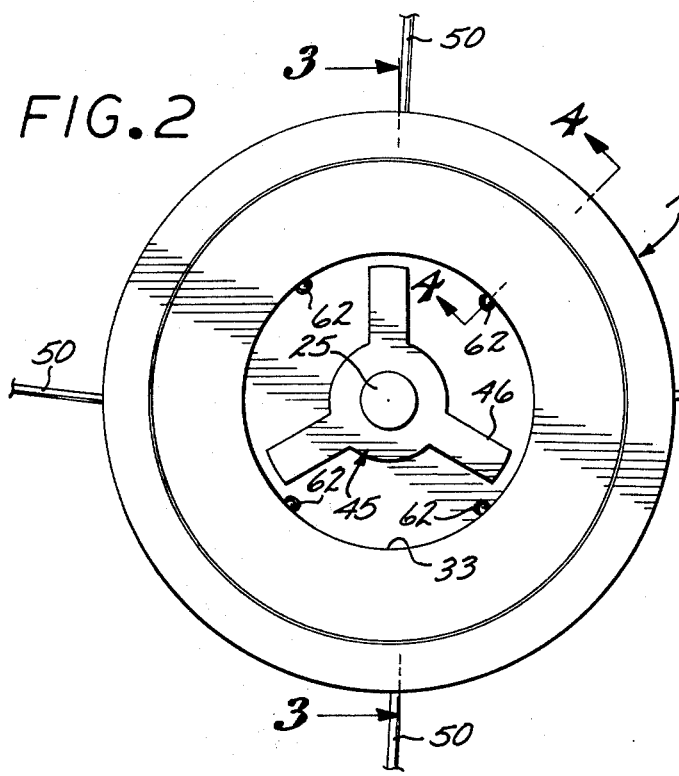
FIG. 2 is a side view of the rotary cutter assembly shown in FIG. 1.
Figure 3:
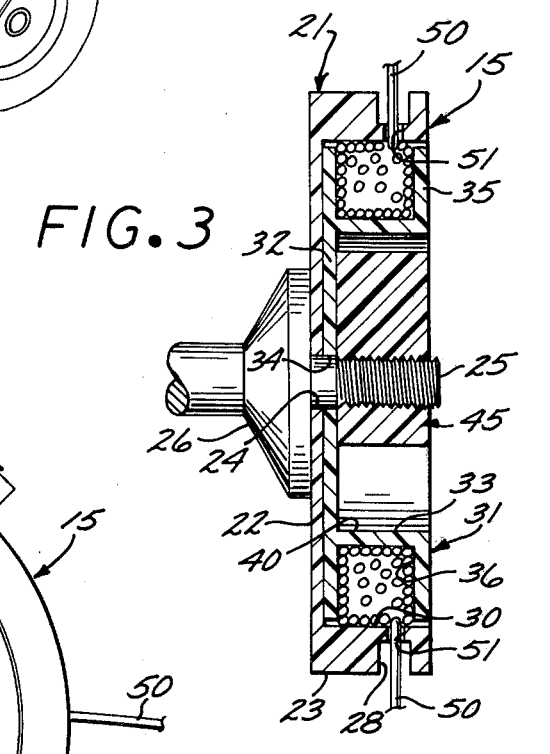
FIG. 3 is a sectional view taken along line 3—3 of FIG. 2.

As shown in FIG. 1 a lawn edger generally designated by the numeral 10 comprises a gasoline engine 11 mounted for translation on a support base including wheels 12. The gasoline engine 11 is provided with an output shaft 13 engaging a drive belt 14 which in turn drives in rotation a rotary cutter assembly 15 constructed according to the present invention. More specifically as shown in FIGS. 2 and 3 the cutter assembly 15 includes a circular retainer 21 formed in the manner of a circular disk 22 having attached to one peripheral edge thereof a tubular section 23. Disk 22 furthermore includes a central bore 24 therein which is adapted to telescopically receive a threaded stud 25 extending axially from the securing surface of a rotary arbor 26. Arbor 26 is in turn conventionally connected for rotation by the drive belt 14. It is intended that the direction of assembly of retainer 21 be such that the tubular section 23 extend away from the seat of arbor 26, in an annular arrangement around shaft 25. Thus the tubular section 23 forms a central cavity shown herein as cavity 30 closed by the disk 22 along the surface of the arbor 26. Receivable within the cavity 30 is a circular spool 31, similarly comprising a circular disk 32 having radial dimensions conformed for receiving fit within cavity 30, and including a bore 34 adapted to receive the stud or shaft 25. This relationship aligns spool 31 in concentric relationship within retainer 21. Spool 31 furthermore includes a tubular surface segment 33 disposed to project laterally away from the surface of disk 32 again in an annular arrangement around shaft 25. The free edge of the surface segment 33 is connected to a radial ring 35 whereby a peripheral cavity 36 is formed around the spool 31 by the arrangement of segment 33 on disk 32 and the radial ring 35. The arrangement of section 33 relative to 32 furthermore provides a central cavity 40 arranged to concentrically align the spool on the central axis of shaft 25. Receivable within the cavity 40 is a securing nut 45 which is adapted for threaders engagement to the shaft 25 to compress disk 32 against the opposing surface of disk 22 which then is compressed against the seat of arbor 26. To facilitate manual assembly nut 45 includes a plurality of radially extending webs 46 which are thus exposed for manual turning within the cavity 40.

Deployed within the peripheral groove 36 and wound in a spiral take-up are a plurality of plastic filaments 50, each filament 50 being guided to the exterior of retainer 21 through a corresponding radially directed bore 51.

Figure 4:
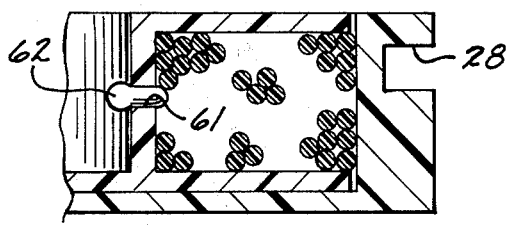
FIG. 4 is a sectional segmental view taken along line 4—4 of FIG. 2.
Figure 5:
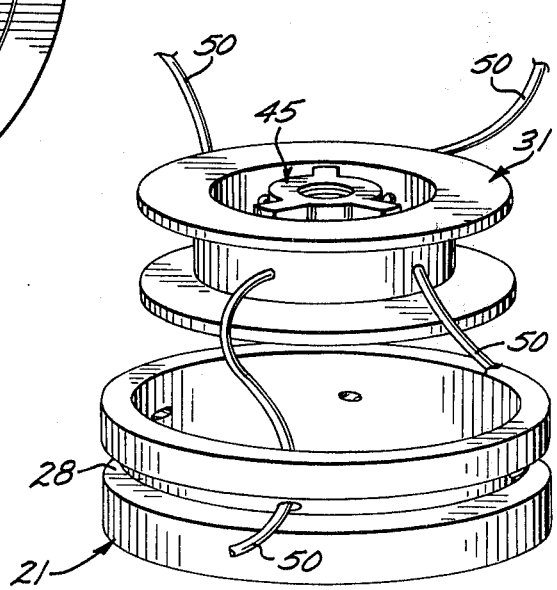
FIG. 5 is a perspective illustration of the assembly sequence rendered possible by the structure of the rotary cutter disclosed herein.

To reduce the localized bending stresses resulting from impact of the strands or filaments 50 against various hard objects or ground and particularly to separate the transverse bending moments or the bending moments resulting from transverse deformations of the filament from the tangential deformations of the filament, there is formed around the periphery of the retainer 21 yet another radially directed groove 28 arranged to contain the radial plane including bores 51 and dimensioned to confine the lateral or transverse bending of the filaments. In this manner large lateral deformations of the filament occur at the point of contact between the peripheral edge of groove 28 and the filament. The tangential bending is in turn confined to the exit contact of filament 50 in bore 51. The localized bending stresses in the filament are thus distributed over two contact areas with the resulting increase in the life of the filament. Furthermore, most breaks if any will therefore be localized within the gap between the two contacts. Thus, the typical problem of a break occuring within the port itself and the resulting difficulty in deploying additional filament length to make up for the loss of the strand is alleviated since normally a small part of the filament will extend within the interior of groove 28. An additional feature of this groove is that it allows a relief for the filaments in any shearing engagement of the retainer against a hard object. Furthermore, the cutter 10 provides beneficial features in the manner of assembly thereof. As shown in FIGS. 4 and 5 the tubular surface segment 33 includes a plurality of radial openings 61 extending thereacross, the number of openings 61 corresponding to the number of filaments 50 intended for deployment. Openings 61 are dimensionally conformed to the exterior dimensions of the filament which is provided with one enlarged or bulbous end shown by way of a bulb 62. In this form the filament 50 is insertable from the interior of cavity 40 into the peripheral groove 36 around the spool 31. From this connection the respective filaments 50 are then passed into the corresponding bores 51. After this step is acheived the spool 31 can then be inserted into the interior of the cavity 30 in retainer 21 and the locking nut can be brought down onto the shaft 25. The spool 31 can then be turned within the retainer, taking up the filaments until only a desired dimension thereof is deployed. Once this manipulation is made the locking nut 25 can then be manually forced down to secure in rotation both the spool and the retainer relative the arbor 26.

As shown in FIG. 6, 8, 9 and 10, a further embodiment of a cutter assembly is generally identified by the numeral 115. In this embodiment, a similarly constructed spool 131, including a peripheral cavity 136 bounded by a disc 132 and an annular ring 135, each adapted to be received in dished retainer 121. Both the spool 131 and retainer 121 include corresponding central bores 124 and 134 for concentric mounting on the arbor 26. To this extent, both embodiments are essentially similar; the second embodiment however includes a plurality of radial cutouts 170 formed around the exterior periphery of ring 135 and dimensioned to receive in interference fit the filaments 50 stored on the spool. Thus, prior to insertion of the spool 131 into the interior of retainer 121, the plastic filaments 50 are manually forced into the radial cutouts 170. A spool having radial dimensions closely matched with the cavity in the retainer can thus be inserted without extensive prior manipulation of the filaments. After this insertion, the projecting filaments 50 are deployed into their cutting alignment through a plurality of similarly spaced longitudinal slots 175 formed in the peripheral surface of retainer 121.

More specifically the retainer 121, similar to the first embodiment, includes an exteriorly directed peripheral 128 communicating with the retainer interior cavity by way of a plurality of tangentially elongated filament deploying openings 151. Each slot 175, therefore, extends from the free edge of retainer 121 to center of a corresponding opening 151 allowing for the passage of the corresponding filaments 50 from their retained position in cutouts 170 into the openings. The normal tangential forces encountered during operation displace the filaments from the opening center, thus precluding an inadvertent return thereof. This arrangement can be further secured by a partial rotation of spool 131 within retainer 121 which, as shown in FIGS. 7 and 9 moves the cutouts 170 out of alignment with slots 175.

In addition to these structural features, each cutout 170 includes formed thereabout a semicircular concave deformation 171 in the exterior of ring 135. These deformations reduce the local sectional thickness of the ring thus reducing the manual force levels necessary in the interference fit deployment of the filament.

The remaining details of this embodiment are essentially similar to the structure disclosed above, and reference should therefore be had to the description of like numbered parts in FIGS. 1–5.

Some of the many advantages of the present invention should now be readily apparent. The invention provides by means which are easily produced a device which is both convenient in assembly and furthermore would provide the largest stress concentration in the filaments to occur at a point beyond the receipt thereof within the interior of the retainer.

Obviously many modifications and variations to the above disclosure can be made without departing from the spirit of the invention. It is therefore intended that the scope of the invention be determined solely dependent on the claims herewith.

We claim:

1. A rotary cutter assembly adapted for attachment to an arbor driven in rotation, comprising:
   a circular spool adapted for mounting on said arbor and including a storage groove around the periphery thereof, a circular cavity concentrically disposed on the interior of said groove, and a plurality of openings disposed to radially communicate between said cavity and said storage groove;
   a plurality of plastic filaments each terminating in one enlarged bulbous end, each said filament being conformed in section for receipt in said openings with said bulbous end disposed in said circular cavity; and
   an annular retainer adapted for mounting on said arbor in concentric alignment around said spool including a stress relief groove formed on the exterior periphery thereof and a plurality of filament receiving bores communicating between said stress relieving groove and said spool for conveying said filaments from said spool to the exterior of said retainer.

2. Apparatus according to claim 1 further comprising: threadable engagement means connected to said arbor for selectively securing in rotation said spool and said retainer thereto.

3. Apparatus according to claim 2 wherein:
said spool is selectively rotatable on said arbor relative to said retainer for winding up said filaments onto said storage groove.

4. Apparatus according to claim 3 wherein:
said arbor includes a threaded stud extending to engage said spool and said threadable engagement means includes a wing nut adapted for threaded engagement with said stud and conformed for receipt within said cavity in said spool.

5. Apparatus according to claim 4 wherein:
said spool and retainer each include a central bore adapted for mounting on said stud to be selectively secured by said wing nut.

6. A rotary cutter assembly adapted for attachment to an arbor driven in rotation, comprising:
   a circular spool adapted for mounting on said arbor and including a storage groove around the periphery thereof bounded by two annular concentric surfaces, a circular cavity concentrically disposed within said spools and one of said annular surfaces, a plurality of openings disposed to radially communicate between said cavity and said storage groove and a plurality of radial cutouts formed in the exterior peripheral edge of one of said annular surfaces;
   a plurality of plastic filaments each terminating in one enlarged bulbous end, each said filament being conformed in section for receipt in said openings, with said bulbous end disposed in said circular cavity each said plastic filament being dimensioned for interference fit in said cutouts; and
   an annular retainer adapted for mounting on said arbor in concentric alignment around said spool including a relief groove formed on the exterior periphery thereof, a plurality of filament receiving bores communicating between said relief groove and said spool and a plurality of longitudinal slots extending partly across said retainer to communicate with said receiving bores for conveying said filaments from said cutouts into said bores.

7. Apparatus according to claim 6 wherein:
said spool is selectively rotatable on said arbor relative said retainer for staggering the alignment of said radial cutouts relative said longitudinal slots.

8. Apparatus according to claim 7 wherein:
said arbor includes a threaded stud extending to engage said spool and said threadable engagement means includes a wing nut adapted for threaded engagement with said stud and conformed for receipt within said cavity in said spool; and
said spool and retainer each include a central bore adapted for mounting on said stud to be selectively secured by said wing nut.

* * * * *